(12) United States Patent
DeLuca

(10) Patent No.: US 10,984,303 B2
(45) Date of Patent: Apr. 20, 2021

(54) INCREASED SECURITY FOR RADIO FREQUENCY IDENTIFICATION (RFID) TRANSACTIONS

(71) Applicant: INTERNATIONAL BUSINESS MACHINES CORPORATION, Armonk, NY (US)

(72) Inventor: Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/558,463

(22) Filed: Sep. 3, 2019

(65) Prior Publication Data

US 2021/0064950 A1 Mar. 4, 2021

(51) Int. Cl.
*G06K 19/07* (2006.01)
*G06Q 20/32* (2012.01)
(Continued)

(52) U.S. Cl.
CPC ....... *G06K 19/0728* (2013.01); *G06Q 20/206* (2013.01); *G06Q 20/3224* (2013.01); *G06Q 20/3278* (2013.01); *G06Q 20/4014* (2013.01)

(58) Field of Classification Search
CPC ........... G06K 19/0728; G06Q 20/4014; G06Q 20/3224; G06Q 20/3278; G06Q 20/206
See application file for complete search history.

(56) References Cited

U.S. PATENT DOCUMENTS 7,123,879 B2 * 10/2006 Koketsu ............... G07B 15/063
   455/41.2
8,292,168 B2    10/2012 Vilnai
                (Continued)

FOREIGN PATENT DOCUMENTS

IN    201721002304 A    7/2018
WO    2012175296 A2    12/2012

OTHER PUBLICATIONS

Bonthu et al, "Optimized Warning and Protection System for Vehicle Using RFID-based Networks." Indian Journal of Science and Technology, (2016).9(28), DOI: 10.17485/ijst/2016/v9i28/91211.

(Continued)

*Primary Examiner* — Seung H Lee
(74) *Attorney, Agent, or Firm* — Robert C. Bunker

(57) ABSTRACT

A computer-implemented method for increasing security for radio frequency identification (RFID) transactions. The computer-implemented method includes receiving an RFID transaction via an RFID tag and identifying an account associated with the RFID tag. The computer-implemented method further includes determining if the account has an increased security feature enabled on the RFID tag, and verifying with an owner of the account that the RFID transaction is authorized. In exemplary embodiments, the computer-implemented method further includes determining if the account has an electronic personal assistant set up, engaging the owner of the account associated with the RFID tag by accessing the electronic personal assistant, and requesting an authorization from the owner of the account to verify the RFID transaction. In exemplary embodiments, the electronic personal assistant is an in-vehicle voice assistant.

14 Claims, 5 Drawing Sheets

(51) Int. Cl.
  *G06Q 20/20* (2012.01)
  *G06Q 20/40* (2012.01)

(56) References Cited

U.S. PATENT DOCUMENTS

| | | | |
|---|---|---|---|
| 8,912,924 | B2 | 12/2014 | Scofield |
| 9,436,430 | B2 * | 9/2016 | Hayashi ................ G10L 13/02 |
| 10,019,706 | B2 | 7/2018 | Geist |
| 10,078,831 | B2 | 9/2018 | Li |
| 10,464,489 | B2 * | 11/2019 | Boehm ................ B60Q 9/00 |
| 2005/0285743 | A1 | 12/2005 | Weber |
| 2011/0208568 | A1 * | 8/2011 | Deitiker ............ G07B 15/063 |
| | | | 705/13 |
| 2015/0134428 | A1 | 5/2015 | Li |
| 2017/0249635 | A1 | 8/2017 | Baur |

OTHER PUBLICATIONS

Carr, "E-Z Pass Payments for Tolls, Parking, and Big Macs?", Nov. 27, 2012, https://www.fastcompany.com/3003456/e-z-pass-payments-tolls-parking . . . , pp. 1-5.

Culver, "Virginia Woman on the Hook for $1,000 Billed to E-ZPass Stolen After Severe Car Wreck", Sep. 11, 2014, https://www.nbcwashington.com/news/local/Virginia-Woman-on-the-Ho . . . , p. 1.

Grossman, "Fast Food Drive-Thrus Are Getting E-ZPass System So You Don't Have to Exhaust Yourself Digging for Change", Dec. 16, 2013, http://newsfeed.time.com/2013/12/16/fast-food-gets-even-faster-with-ne . . . , pp. 1-2.

Kapustka, "StadiumPark Touts E-Z Pass for Stadiums' Parking App Idea", Jun. 24, 2014, https://www.mobilesportsreport.com/2014/06/stadiumpark-touts-ez-pass- . . . , pp. 1-2.

Mahesh, B. Prabu, S. F., Kumar, M. A. et al. (2016). Theft Vehicle Identification System in Toll Gate by using RFID , GSM and Visual Basic front end. International Journal of Scientific Engineering and Applied Science (IJSEAS), 2(3).

Mell et al., "The NIST Definition of Cloud Computing", National Institute of Standards and Technology, Special Publication 800-145, Sep. 2011, pp. 1-7.

Nagaraju, N., Kiruthika, M. S., Gowthami, R. et al. (2014). "Auto Payment of Tolls with Tracking of Theft Vehicles & Proximity Detection for Avoiding Accidents. International Journal of Advanced Research in Electrical, Electronics and Instrumentation Engineering", 3(4).

You Tube, "IBM Distinguished Engineer Lisa Seacat DeLuca Discusses HARMAN'S Digital Cockpit at IBM Think 2018", Mar. 26, 2018, https://www.youtube.com/watch?v=QpmbdBgGga0, pp. 1-2.

Fox News, "Company Lets Drive-Thru Customers Pay for Fast Food with E-ZPass", Food Trents, Dec. 16, 2013, pp. 1-6.

* cited by examiner

US 10,984,303 B2

INCREASED SECURITY FOR RADIO FREQUENCY IDENTIFICATION (RFID) TRANSACTIONS

BACKGROUND

Embodiments of the present invention relate generally to the field of computing and more particularly to data processing and verification of radio frequency identification transactions.

In this fast moving world, stopping to pay for a purchase can really slow one down, not to mention create a line of frustrated consumers that now need to wait for a cashier to accept payment, make change, and return the change to the consumer.

Nowadays, wireless transactions allow consumers to instantly make purchases on-the-go with radio frequency identification (RFID) tags attached to the windshield of a car. Some examples of wireless on-the-go transactions may include toll booth collections, parking fees, etc.

However, a visible RFID tag is subject to theft and thus innumerable fraudulent charges by a thief.

SUMMARY

Embodiments of the invention include a method, computer program product, and system, for increasing RFID transaction security.

A method, according to an embodiment, for increasing RFID transaction security includes receiving an RFID transaction via an RFID tag, identifying an account associated with the RFID tag, determining if the account has an increased security feature enabled on the RFID tag, and verifying with an owner of the account that the RFID transaction is authorized.

A computer program product, according to an embodiment of the invention, includes a non-transitory tangible storage device having program code embodied therewith. The program code is executable by a processor of a computer to perform a method. The method includes receiving an RFID transaction via an RFID tag, identifying an account associated with the RFID tag, determining if the account has an increased security feature enabled on the RFID tag, and verifying with an owner of the account that the RFID transaction is authorized.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes receiving an RFID transaction via an RFID tag, identifying an account associated with the RFID tag, determining if the account has an increased security feature enabled on the RFID tag, and verifying with an owner of the account that the RFID transaction is authorized.

DETAILED DESCRIPTION

As previously described, existing RFID tags are subject to theft and, consequently, fraudulent charges. What is needed is a way for users to add increased security measures to their RFID tags so that, even if stolen, a user may authorize or deny RFID transactions in real-time.

The subject invention allows for a seamless integration of increased security associated with RFID tags of a user in order to avoid an accumulation of fraudulent charges before the user even realizes that the RFID tag has been stolen, or being used without user authorization.

The subject invention may be offered to customers of many types of transportation. Some examples may include bus companies, train companies, automobile companies, airline companies, public transit, food and beverage drive thru restaurants, gated community centers, stadium parking, airport parking, bridges and tolls authorities, trucking lines, cruise lines, and hotel chains just to name a few.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
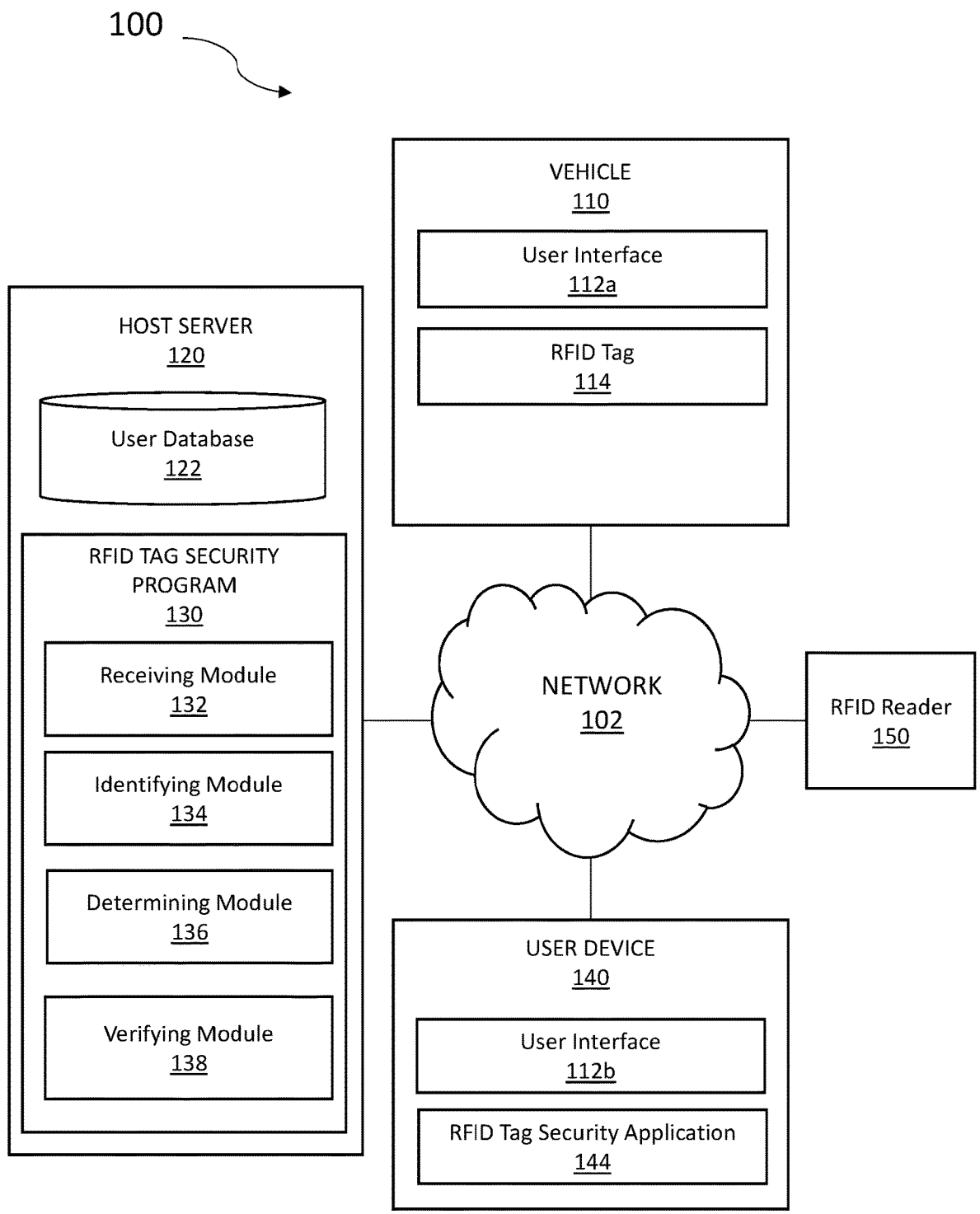
FIG. 1 illustrates an RFID tag security computing environment, in accordance with an embodiment of the present invention.

FIG. 1 illustrates RFID tag security computing environment 100, in accordance with an embodiment of the present invention. RFID tag security computing environment 100 includes vehicle 110, server 120, user device 140, and RFID reader 150, all connected via network 102. The setup in FIG. 1 represents an example embodiment configuration for the present invention, and is not limited to the depicted setup in order to derive benefit from the present invention.

In an exemplary embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth® (Bluetooth and all Bluetooth-based trademarks and logos are trademarks or registered trademarks of Bluetooth SIG, Inc. and/or its affiliates) network, a WiFi network, or a combination thereof. In general, network 102 can be any combination of connections and protocols that will support communications between vehicle 110, host server 120, user device 140, and RFID reader 150.

In an exemplary embodiment, vehicle 110 includes user interface 112a and RFID tag 114. In exemplary embodiments, vehicle 110 may be a car, a minivan, a truck, a tractor-trailer, a train, a motorcycle or any road vehicle capable of utilizing an RFID tag 114.

In exemplary embodiments, vehicle 110 includes user interface 112a which may be a computer program that allows a user to interact with vehicle 110 and other connected devices via network 102. For example, user interface 112a may be a graphical user interface (GUI). In addition to comprising a computer program, user interface 112a may be connectively coupled to hardware components, such as those depicted in FIG. 3, for sending and receiving data. In an exemplary embodiment, user interface 112a may be a web browser, however in other embodiments user interface 112a may be a different program capable of receiving user interaction and communicating with other devices, such as host server 120.

In an exemplary embodiment, user interface 112a may include a voice interface such as IBM Watson® Personal Assistant (Watson and all Watson-based trademarks and logos are trademarks or registered trademarks of International Business Machines Corporation and/or its affiliates), thus allowing RFID tag security program 130 to hook in to vehicle 110 and obtain user authorizations, access to user information, personalized responses from an associated user, and so forth.

IBM Watson® Personal Assistant, in exemplary embodiments, is a conversational interface that may be embedded in any "thing", such as vehicle 110, and uses artificial intelligence (AI) to determine when to search for an answer in a knowledge base, when to ask for clarity, and when to direct a user to a human interface. In various embodiments, IBM Watson® Personal Assistant may be accessed via voice or text interaction and gets to know a person more through each and every interaction.

In exemplary embodiments, an RFID tag 114 is a removable tag (e.g., RFID transponder) placed in vehicle 110 and transmits/receives information via an antenna and a microchip. In exemplary embodiments, RFID tag 114 may transmit information (a user's credit card information, account information, etc.) via low frequency, high frequency, and near field communication (NFC). When the RFID tag 114 is scanned by a reader, such as RFID Reader 150 (e.g., toll booth, fast food drive thru, gated community, drive-in movie theatre, and so forth), the reader transmits energy to the tag which powers it enough for the chip and antenna to relay information back to the reader. The reader then transmits the information back to an RFID computer program, such as RFID tag security program 130, for interpretation.

An RFID tag 114 cannot distinguish between readers, and as such the information can be read by almost anyone once it has left the original supply chain. Additionally, since RFID tags 114 are so portable, and the range of some RFID tags 114 are so great, unintended users may be able to gather information that they would otherwise not have access to, thus increasing the possibility of the unintended collection of potentially sensitive information without a user's knowledge.

Furthermore, RFID tags 114 may be linked to a user's credit card thus creating the potential for financial theft and fraud. The present disclosure thus seeks to provide an increased layer of security for RFID tag 114 transactions.

With continued reference to FIG. 1, host server 120 includes user database 122 and RFID tag security program 130, and may be a laptop computer, tablet computer, netbook computer, personal computer (PC), a desktop computer, a personal digital assistant (PDA), a smart phone, or any programmable electronic device capable of communicating with vehicle 110 and user device 140, via network 102. While host server 120 is shown as a single device, in other embodiments, host server 120 may be comprised of a cluster or plurality of computing devices, working together or working separately. In a preferred embodiment, host server 120 may be implemented in a cloud computing environment, as described in relation to FIGS. 4 and 5, herein.

In an exemplary embodiment, user database 122 is a database storage that may contain account information such as the one or more names of users associated with one or more vehicles, a transaction log history for RFID tag 114 transactions associated with a specific user and a specific vehicle, and so forth. A transaction log history may include dates, times, transaction amounts, location of transaction, and so forth.

In exemplary embodiments, user database 122 may store user names with corresponding vehicles, account information (e.g., names of user(s) associated with an account), security preferences, RFID transaction history, and location as data objects according to any category or organization deemed most useful for the invention to be utilized. For example, an exemplary data object may be stored as <user1, sedanLicensePlate123ABC, RFIDtag #54321, accountDebit, securityON>.

In exemplary embodiments, RFID transaction history, security preferences, etc. may be updated in user database 122 in real-time.

In various embodiments, user database 122 may be capable of being stored on host server 120, user device 110, or RFID tag security program 130, as a separate database.

In an exemplary embodiment, RFID tag security program 130 contains instruction sets, executable by a processor, which may be described using a set of functional modules. The functional modules of RFID tag security program 130 may include receiving module 132, identifying module 134, determining module 136, and verifying module 138.

With continued reference to FIG. 1, user device 140 includes user interface 112b and RFID tag security application 144, and may be a laptop computer, tablet computer, netbook computer, personal computer (PC), a desktop computer, a personal digital assistant (PDA), a smart phone, or any programmable electronic device capable of communicating with vehicle 110 host server 120, and RFID reader 150, via network 102. While user device 140 is shown as a single device, in other embodiments, user device 140 may be comprised of a cluster or plurality of computing devices, working together or working separately. In a preferred embodiment, user device 140 may be implemented in a cloud computing environment, as described in relation to FIGS. 4 and 5, herein.

In an exemplary embodiment, user interface 112b may be a computer program that allows a user to interact with user device 140 and other connected devices via network 102. For example, user interface 112b may be a graphical user interface (GUI). In addition to comprising a computer program, user interface 112b may be connectively coupled to hardware components, such as those depicted in FIG. 3, for receiving user input. In an exemplary embodiment, user interface 112b may be a web browser, however in other embodiments user interface 112b may be a different program capable of receiving user interaction and communicating with other devices and programs, such as RFID tag security program 130.

In an exemplary embodiment, RFID tag security application 144 may be a web browser or other computer program, on user device 140, that is capable of receiving real-time data from RFID tag security program 130 on host server 120. RFID tag security application 144, in an exemplary embodiment, may be capable of accessing user database 122 to view vehicles associated with a user, users associated with a vehicle, customary location transactions for the user, customary routes of the user, user account information (e.g., security preferences, active users, etc.), and so forth.

In an exemplary embodiment, RFID tag security application 142 receives transactions, from RFID tag 114, in real-time. RFID tag security application 142 includes user preferences, wherein a user may opt-in or opt-out of data tracking and location tracking of an associated RFID tag 114 and associated vehicle 110. In further embodiments, a user may setup security questions, voice recognition, a personal identification number (PIN), and password to be associated with a user account on RFID tag security application 144.

In various embodiments, RFID tag security application 144 may be capable of receiving verification and authorization requests from RFID tag security program 130, in the event an RFID tag 114 user has opted-in to the additional layer of security.

With continued reference to FIG. 1, RFID reader 150 may be a device capable of sending an interrogating signal to an RFID tag 114, via an antenna, and receiving the RFID tag 114's unique information in response. In alternative embodiments, a vehicle 110 may communicate with RFID reader 150 via Bluetooth®, Wireless Fidelity (WiFi), Near Field Communication (NFC) and any other wireless radio communication standard known to one of ordinary skill in the art. The purpose of RFID reader 150, or any other wireless radio communication standard discussed herein, is to associate a user/vehicle with a specific RFID tag 114 (e.g., a specific vehicle make and model). In exemplary embodiments, a user's RFID tag 114 transaction history may be transmitted to RFID tag security program 130 over network 102.

In various embodiments, RFID reader 150 may be located at, but not limited to, a highway toll, a bridge toll, a parking lot entrance, a food and beverage drive thru, a gasoline payment station, a gated community entrance, and an entertainment event such as a drive-in movie theatre and a stadium event.

Figure 2:
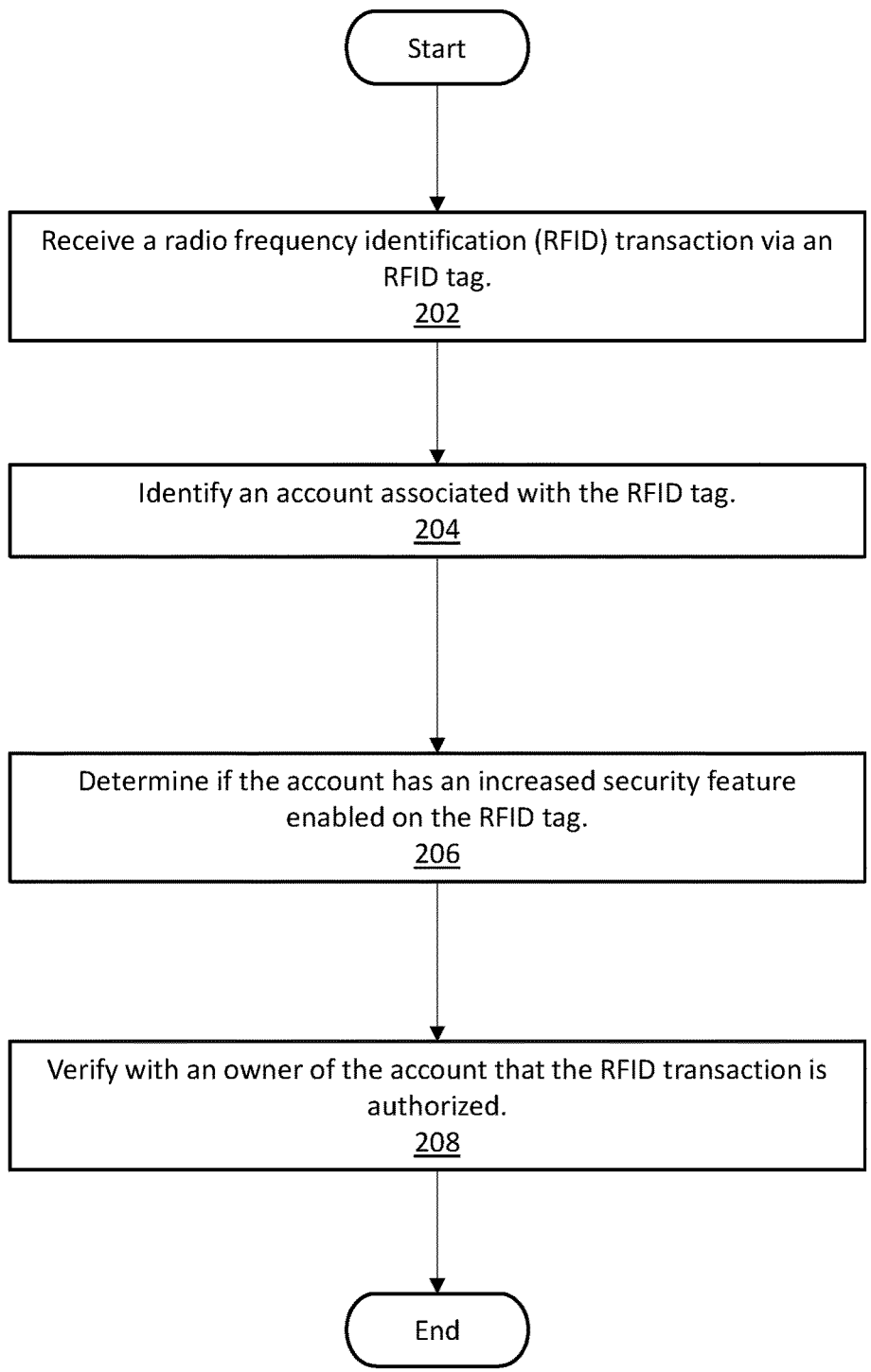
FIG. 2 is a flowchart illustrating the operation of RFID tag security program 130, in accordance with an embodiment of the present invention.

FIG. 2 is a flowchart illustrating the operation of RFID tag security program 130, in accordance with an embodiment of the present invention.

Referring now to FIGS. 1 and 2, receiving module 132 includes a set of programming instructions in RFID tag security program 130. The set of programming instructions is executable by a processor. Receiving module 132 receives an RFID transaction via an RFID tag 114 (step 202).

In exemplary embodiments, an RFID transaction may include an electronic payment for vehicle 110, via RFID tag 114 located within vehicle 110, that passes through a toll booth that includes an RFID reader, such as RFID reader 150. The current invention is not limited to RFID tags 114 being used at toll booths, but may include any and all transactions where a vehicle 110 is capable of purchasing and/or accessing various locations via use of an RFID tag 114, as further described herein.

In further exemplary embodiments, an RFID transaction may include payment for at least one of, but not limited to, the following: a highway toll, a bridge toll, a parking fee, a food and beverage drive thru, a gasoline payment, access to a gated community, and an entertainment event such as a drive-in movie theatre and a stadium event.

With reference to an illustrative example, Bob has an RFID tag 114 on his minivan, which allows him to pass through the toll booths on Interstate 90 without having to stop and pay. Bob is driving on Interstate 90 and passes through a toll booth. Receiving module 132 automatically receives the toll booth transaction via RFID tag 114.

With continued reference to FIGS. 1 and 2, identifying module 134 includes a set of programming instructions in RFID tag security program 130. The set of programming instructions is executable by a processor. Identifying module 134 identifies an account associated with the RFID tag 114 (step 204).

In exemplary embodiments, identifying module 134 accesses user database 122 to retrieve the one or more user names associated with the received RFID tag 114 transaction.

With continued reference to the illustrative example above, identifying module 134 cross-references the RFID tag 114 transaction with an account number associated with the RFID tag 114. Identifying module 134 retrieves Bob's account information in user database 122. Bob's account information includes the make/model of Bob's vehicle, RFID tag 114 transaction history, security preferences, other users associated with RFID tag 114, and so forth.

With continued reference to FIGS. 1 and 2, determining module 136 includes a set of programming instructions in seat visualization program 130. The set of programming instructions is executable by a processor. Determining module 136 determines if the account has an increased security feature enabled on the RFID tag 114 (step 206).

In exemplary embodiments, determining module 136 utilizes the retrieved account information, associated with the received RFID tag 114 transaction, to further access an account owner's profile in user database 122. The account owner's profile may also indicate an account owner's preferences associated with the RFID tag 114, for example, whether the account owner opted-in to the increased security feature offered by RFID tag security program 130. In exemplary embodiments, an increased security feature offered by the RFID tag security program 130 includes authorization requests, two-step verifications, and any other security feature known to one of ordinary skill in the art.

In further exemplary embodiments, determining module 136 determines the preferred method to communicate with the account holder to verify and/or authorize RFID tag 114 transactions, as identified in user database 122. For example, an account holder, or user, may prefer to communicate with RFID tag security program 130 via an in-vehicle personal assistant, such as IBM Watson® Personal Assistant. In other instances, an account holder may prefer to communicate with RFID tag security program 130 via user device 140 (e.g., mobile device, laptop, etc.).

Referring back to the illustrative example above, determining module 136 determines that Bob has enabled the additional security features for his RFID tag 114. Furthermore, determining module 136 determines that Bob's car is equipped with IBM Watson® Personal Assistant as Bob's preferred mode of communicating with RFID tag security program 130. Alternatively, determining module 136 determines that Bob's backup communication preference is a phone call or text message to his personal mobile device.

With continued reference to FIGS. 1 and 2, verifying module 138 includes a set of programming instructions in seat visualization program 130. The set of programming instructions is executable by a processor. Verifying module 138 verifies with an owner of the account that the RFID transaction is authorized (step 208).

In exemplary embodiments, RFID tag security program 130 determines that an owner of the account has an electronic personal assistant set up. Verifying module 138 verifies with the owner of the account that the RFID transaction is authorized by engaging the owner of the account associated with the RFID tag 114, via the electronic personal assistant. In preferred embodiments, the electronic personal assistant is an in-vehicle voice assistant, such as IBM Watson® Personal Assistant.

In exemplary embodiments, verifying module 138 requests an authorization from the owner of the account to verify the RFID transaction. An authorization may be a password, a personal identification number, a voice recognition feature, and a series of security questions that only the user would know.

In further embodiments, RFID tag security program 130 may have access to an account owner's electronic calendar, schedule, contacts, and/or location. As such, verifying module 138 may be capable of requesting an authorization from the owner of the account via tailored, dynamic questions related to the account owner's daily schedule/calendar (e.g., who was your last business meeting with?, Where did you eat dinner last night?, etc.). Prior to RFID tag security program 130 gaining access to an account owner's electronic calendar, schedule, contacts, and/or location, the account owner would have to voluntarily opt-in to this feature, with full knowledge and consent. In exemplary embodiments, an account owner would always have the ability to opt-out of any tracking, or data collection, features associated with RFID tag security program 130.

In alternative embodiments, verifying module 138 may request that the owner of the account authorize the RFID transaction via the in-vehicle electronic personal assistant and alert authorities (e.g., police, highway authority, toll booth operator, credit card company, a friend or family member, etc.) in the event the owner of the account denies the authorization request. In exemplary embodiments, an account owner may select and prioritize, via user preferences in an account owner's user account profile, specific authorities to alert in the event the account owner denies the authorization request.

In various embodiments, the owner of the account may deny the authorization request if the account owner's RFID tag 114 has been stolen and being used without the account owner's authorization.

In exemplary embodiments, RFID tag security program 130 is capable of transmitting an alert message to authorities via telephone (with a recorded message stating that a user's RFID tag 114 is stolen), text message, electronic mail, and so forth. In further embodiments, RFID tag security program 130 is capable of live-tracking an account owner's RFID tag 114 via global positioning system (GPS), with the account owner's knowledge and consent, in order to track down the stolen RFID tag 114 that is being used without authorization.

In exemplary embodiments, GPS is a computer program on RFID tag 114 that provides time and location information for a vehicle 110. Modern GPS systems operate on the concept of time and location. In modern GPS systems, four or more satellites broadcast a continuous signal detailing satellite identification information, time of transmission (TOT), and the precise location of the satellite at the time of transmission. When a GPS receiver picks up the signal, it determines the difference in time between the time of transmission (TOT) and the time of arrival (TOA). Based on the amount of time it took to receive the signals and the precise locations of the satellites when the signals were sent, GPS receivers are capable of determining the location where the signals were received. In the exemplary embodiment, GPS is capable of providing real-time location detection of the RFID tag 114.

In alternative embodiments, the RFID tag 114 may automatically lock access to the account in the event the owner of the account denies authorization for the RFID transaction request. The owner of the account may be capable of adjusting security preferences for unauthorized use of RFID tag 114.

In alternative embodiments, verifying module 138 is capable of pairing a computing device of the user, such as user device 140, with the RFID tag 114 associated with the user. Pairing may be accomplished by any wireless communication known to one of ordinary skill in the art. Verifying module 138 may further determine that the associated user is present during an RFID transaction, based on the pairing, and thus automatically authorize the RFID transaction.

In further alternative embodiments, verifying module 138 may engage a non-personal assistant backup communication system of the owner of the account. For example, verifying module 138 may transmit an authorization request to a computing device of the owner of the account, such as user device 140, and request a verification from the owner of the account authorizing the RFID transaction.

Referring back to the illustrative example above, verifying module 138 uses an application programming interface (API) to connect with Bob's in-vehicle IBM Watson® Personal Assistant software to ask Bob if he authorizes the recent toll transaction on Interstate 90. Bob says "yes" and the transaction is securely charged to Bob's account. However, later in the afternoon Bob is driving home from work and verifying module 138 again connects to Bob's in-vehicle IBM Watson® Personal Assistant and prompts Bob to authorize a recent RFID transaction on Highway 61. Bob looks up at his windshield and realizes that someone has stolen his RFID tag 114. Bob promptly says "no" to deny the recent RFID transaction. The authorities are immediately alerted, via RFID tag security program 130, in order to pursue the vehicle possessing Bob's RFID tag 114. Additionally, Bob calls the police to alert them to the theft.

Figure 3:
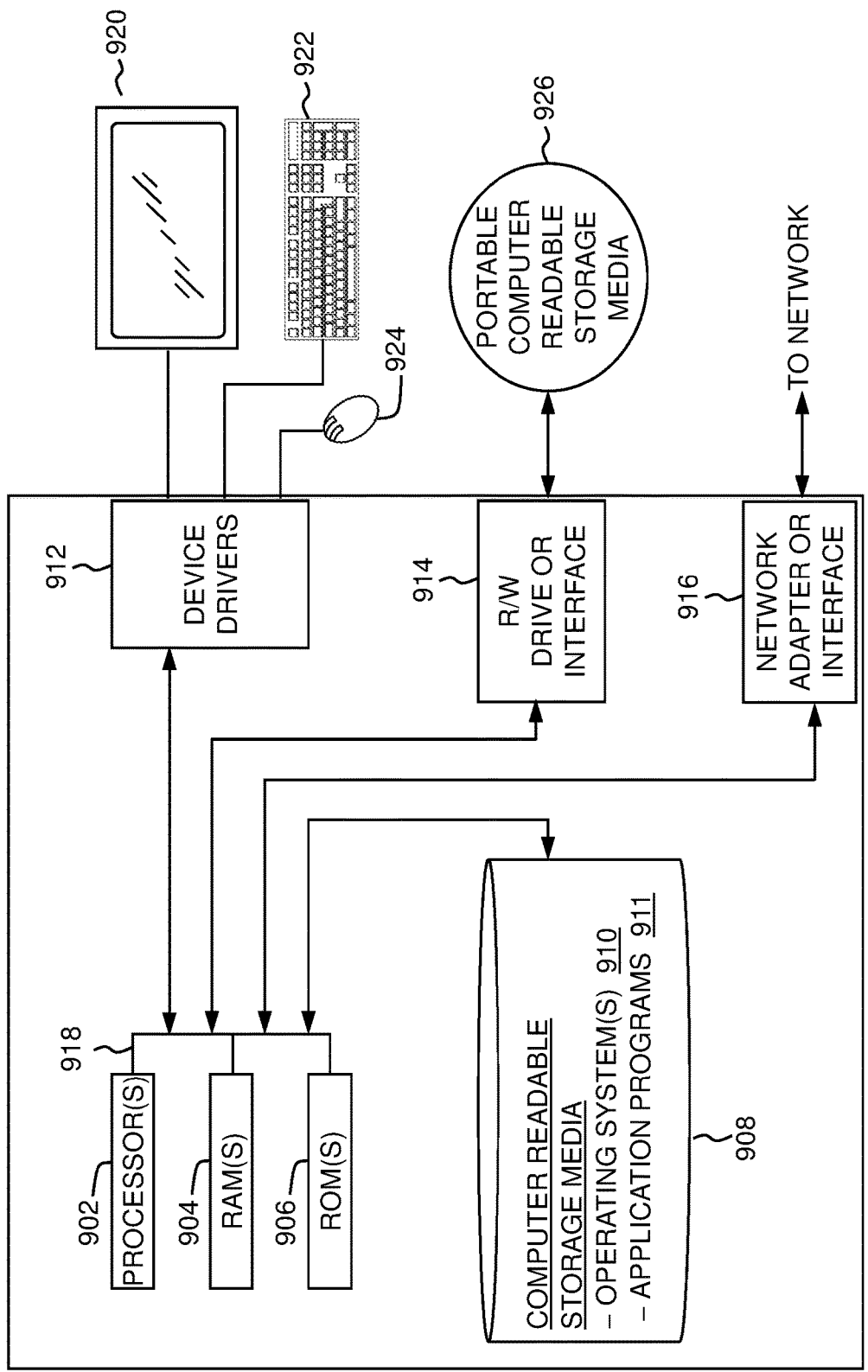
FIG. 3 is a diagram graphically illustrating the hardware components of the RFID tag security computing environment of FIG. 1, in accordance with an embodiment of the present invention.

FIG. 3 is a block diagram depicting components of a computing device in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as RFID tag security program 130, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 3 may also include a R/W drive or interface 914 to read from and write to one or more portable computer readable storage media 926. Application programs 911 on computing device may be stored on one or more of the portable computer readable storage media 926, read via the respective R/W drive or interface 914 and loaded into the respective computer readable storage media 908.

Computing device of FIG. 3 may also include a network adapter or interface 916, such as a TCP/IP adapter card or wireless communication adapter (such as a 4G wireless communication adapter using OFDMA technology). Application programs 911 on computing device of FIG. 3 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
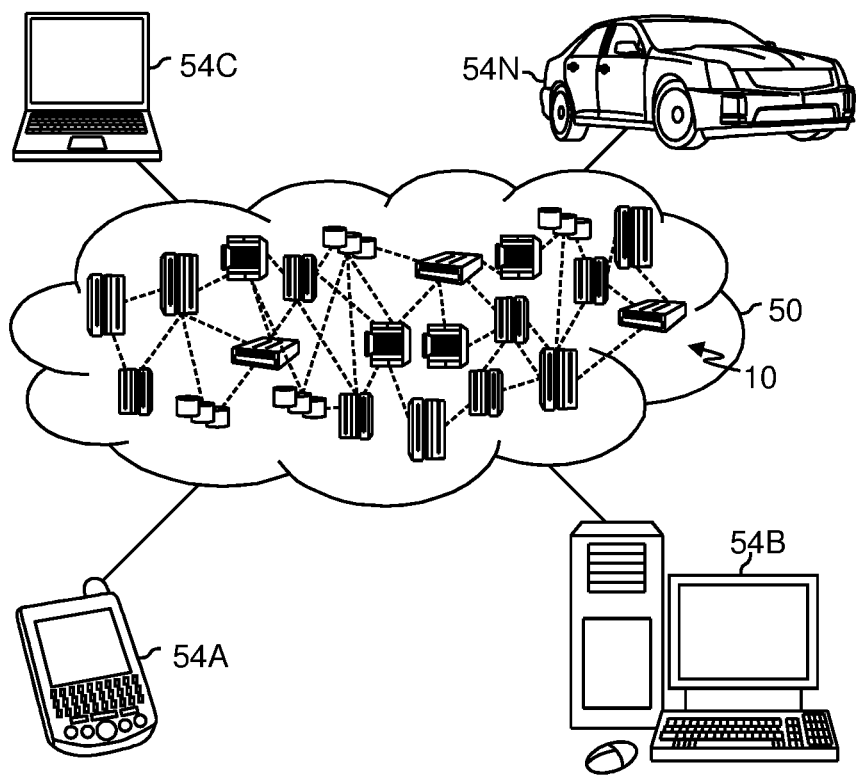
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
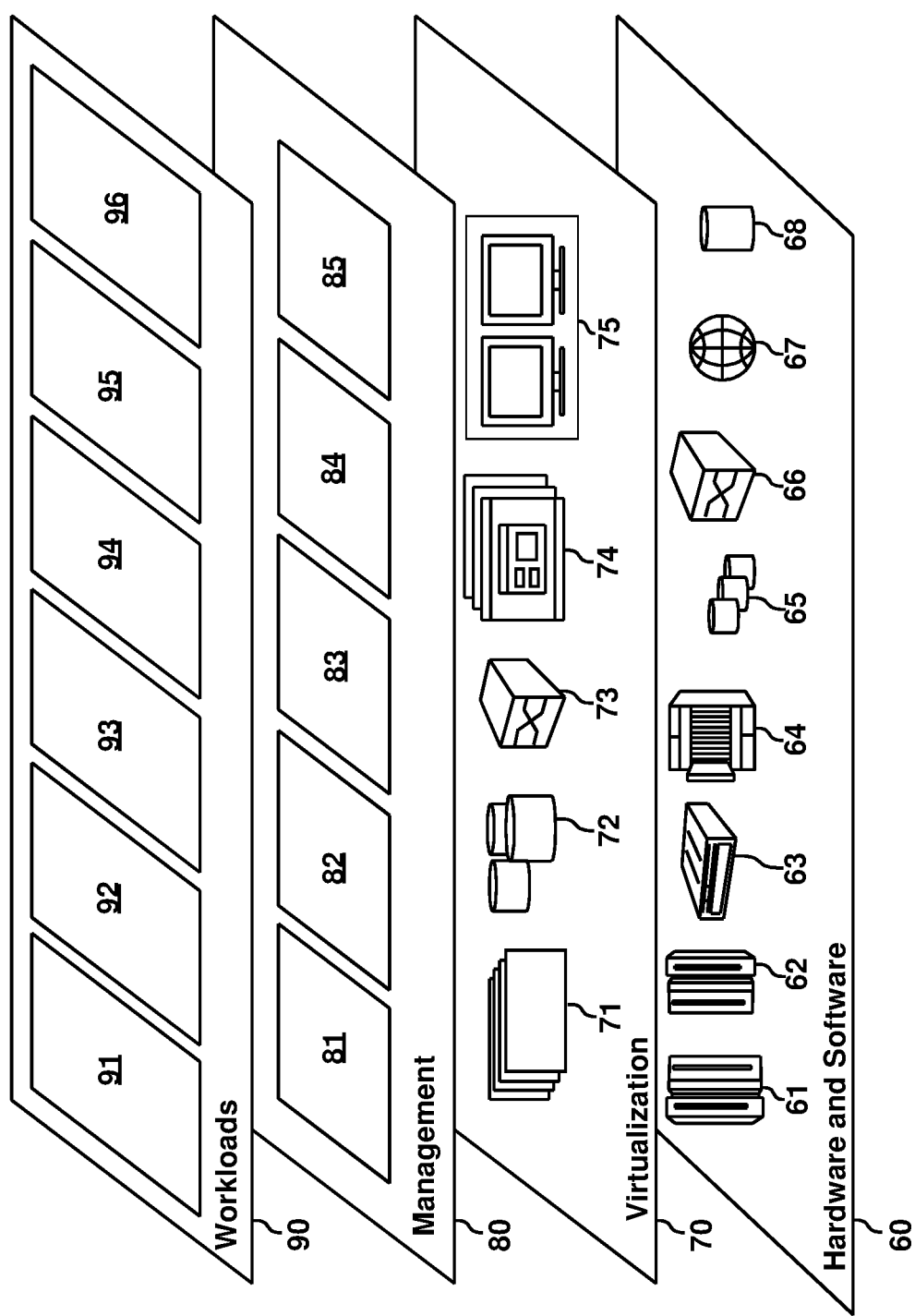
FIG. 5 depicts abstraction model layers of the illustrative cloud computing environment of FIG. 4, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; analytics services 96, including those described in connection with FIGS. 1-5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
receiving a radio frequency identification (RFID) transaction via an RFID tag;
identifying an account associated with the RFID tag;
determining if the account has an increased security feature enabled on the RFID tag; and
verifying with an owner of the account that the RFID transaction is authorized,
wherein verifying with the owner of the account that the RFID transaction is authorized, further comprises:
determining if the owner of the account has an electronic personal assistant set up;
engaging the owner of the account associated with the RFID tag by accessing the electronic personal assistant, wherein the electronic personal assistant is an in-vehicle voice assistant; and
requesting an authorization from the owner of the account to verify the RFID transaction.

2. The computer-implemented method of claim 1, wherein verifying with the owner of the account that the RFID transaction is authorized, further comprises:
requesting the owner of the account to authorize the RFID transaction via the electronic personal assistant;
denying the authorization, by the owner of the account; and
alerting authorities, based on the denied authorization.

3. The computer-implemented method of claim 1, wherein verifying with the owner of the account that the RFID transaction is authorized, further comprises:
pairing a computing device of the owner of the account with the RFID tag;
determining that the owner of the account is present based on the pairing; and
authorizing the RFID transaction.

4. The computer-implemented method of claim 1, wherein verifying with the owner of the account that the RFID scan transaction is authorized, further comprises:
transmitting an authorization request to a computing device of the owner of the account; and
requesting a verification from the owner of the account authorizing the RFID transaction.

5. The computer-implemented method of claim 1, wherein the RFID tag is located within a vehicle and used to make a payment for at least one of the following: a highway toll, a bridge toll, a parking fee, a food and beverage drive thru, a gasoline payment, an entertainment event, and access to a gated community.

6. A computer program product, comprising a non-transitory tangible storage device having program code embodied therewith, the program code executable by a processor of a computer to perform a method, the method comprising:

receiving a radio frequency identification (RFID) transaction via an RFID tag;
identifying an account associated with the RFID tag;
determining if the account has an increased security feature enabled on the RFID tag; and
verifying with an owner of the account that the RFID transaction is authorized,
 wherein verifying with the owner of the account that the RFID transaction is authorized, further comprises:
  determining if the owner of the account has an electronic personal assistant set up;
  engaging the owner of the account associated with the RFID tag by accessing the electronic personal assistant, wherein the electronic personal assistant is an in-vehicle voice assistant; and
  requesting an authorization from the owner of the account to verify the RFID transaction.

7. The computer program product of claim 6, wherein verifying with the owner of the account that the RFID transaction is authorized, further comprises:
 requesting the owner of the account to authorize the RFID transaction via the electronic personal assistant;
 denying the authorization, by the owner of the account; and
 alerting authorities, based on the denied authorization.

8. The computer program product of claim 6, wherein verifying with the owner of the account that the RFID transaction is authorized, further comprises:
 pairing a computing device of the owner of the account with the RFID tag;
 determining that the owner of the account is present based on the pairing; and
 authorizing the RFID transaction.

9. The computer program product of claim 6, wherein verifying with the owner of the account that the RFID scan transaction is authorized, further comprises:
 transmitting an authorization request to a computing device of the owner of the account; and
 requesting a verification from the owner of the account authorizing the RFID transaction.

10. The computer program product of claim 6, wherein the RFID tag is located within a vehicle and used to make a payment for at least one of the following: a highway toll, a bridge toll, a parking fee, a food and beverage drive thru, a gasoline payment, an entertainment event, and access to a gated community.

11. A computer system, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
 receiving a radio frequency identification (RFID) transaction via an RFID tag;
identifying an account associated with the RFID tag;
 determining if the account has an increased security feature enabled on the RFID tag; and
 verifying with an owner of the account that the RFID transaction is authorized, wherein verifying with the owner of the account that the RFID transaction is authorized, further comprises:
  determining if the owner of the account has an electronic personal assistant set up;
  engaging the owner of the account associated with the RFID tag by accessing the electronic personal assistant, wherein the electronic personal assistant is an in-vehicle voice assistant; and
  requesting an authorization from the owner of the account to verify the RFID transaction.

12. The computer system of claim 11, wherein verifying with the owner of the account that the RFID transaction is authorized, further comprises:
 requesting the owner of the account to authorize the RFID transaction via the electronic personal assistant;
 denying the authorization, by the owner of the account; and
 alerting authorities, based on the denied authorization.

13. The computer system of claim 11, wherein verifying with the owner of the account that the RFID transaction is authorized, further comprises:
 pairing a computing device of the owner of the account with the RFID tag;
 determining that the owner of the account is present based on the pairing; and
 authorizing the RFID transaction.

14. The computer system of claim 11, wherein verifying with the owner of the account that the RFID scan transaction is authorized, further comprises:
 transmitting an authorization request to a computing device of the owner of the account; and
 requesting a verification from the owner of the account authorizing the RFID transaction.

* * * * *